United States Patent [19]

Garde

[11] Patent Number: 6,061,779
[45] Date of Patent: May 9, 2000

[54] DIGITAL SIGNAL PROCESSOR HAVING DATA ALIGNMENT BUFFER FOR PERFORMING UNALIGNED DATA ACCESSES

[75] Inventor: Douglas Garde, Dover, Mass.

[73] Assignee: Analog Devices, Inc., Norwood, Mass.

[21] Appl. No.: 09/008,154

[22] Filed: Jan. 16, 1998

[51] Int. Cl.[7] .................................................. G06F 5/01
[52] U.S. Cl. ............................................................ 712/204
[58] Field of Search .................................... 712/200, 204

[56] References Cited

U.S. PATENT DOCUMENTS

| | | | |
|---|---|---|---|
| H1291 | 2/1994 | Hinton et al. ...................... | 395/800.23 |
| 4,164,787 | 8/1979 | Aranguren ............................. | 364/200 |
| 4,439,839 | 3/1984 | Kneib et al. .......................... | 364/900 |
| 4,574,345 | 3/1986 | Konesky ............................... | 364/200 |
| 4,580,214 | 4/1986 | Kubo et al. . | |
| 4,641,238 | 2/1987 | Kneib ................................... | 364/200 |
| 4,754,394 | 6/1988 | Brantley, Jr. et al. ................ | 364/200 |
| 4,800,524 | 1/1989 | Roesgen ............................... | 364/900 |
| 4,809,217 | 2/1989 | Floro et al. ........................... | 364/900 |
| 4,908,748 | 3/1990 | Pathak et al. ......................... | 364/200 |
| 5,010,476 | 4/1991 | Davis .................................... | 364/200 |
| 5,056,000 | 10/1991 | Chang .................................. | 364/200 |
| 5,099,417 | 3/1992 | Magar et al. ......................... | 395/425 |
| 5,151,979 | 9/1992 | Poskitt ................................. | 395/325 |
| 5,187,795 | 2/1993 | Balmforth et al. ................ | 395/800.38 |
| 5,274,789 | 12/1993 | Costa et al. .......................... | 395/425 |
| 5,280,532 | 1/1994 | Shenoi et al. ........................ | 370/118 |
| 5,317,572 | 5/1994 | Satoh ................................. | 370/105.1 |
| 5,325,489 | 6/1994 | Mitsuhira et al. .................... | 395/275 |
| 5,361,370 | 11/1994 | Sprague et al. ...................... | 395/800 |
| 5,386,531 | 1/1995 | Blaner et al. . | |
| 5,390,304 | 2/1995 | Leach et al. ......................... | 395/375 |
| 5,404,522 | 4/1995 | Carmon et al. ...................... | 395/650 |
| 5,423,010 | 6/1995 | Mizukami ............................. | 395/375 |
| 5,438,666 | 8/1995 | Craft et al. ........................... | 395/842 |
| 5,471,607 | 11/1995 | Garde ................................... | 395/550 |
| 5,499,380 | 3/1996 | Iwata et al. . | |
| 5,537,576 | 7/1996 | Perets et al. ......................... | 395/477 |
| 5,577,200 | 11/1996 | Abramson et al. .................. | 712/200 |
| 5,608,885 | 3/1997 | Gupta et al. ......................... | 395/380 |
| 5,619,720 | 4/1997 | Garde et al. ......................... | 395/800 |
| 5,649,138 | 7/1997 | Ireton .................................... | 395/393 |
| 5,668,984 | 9/1997 | Taborn et al. ........................ | 712/222 |
| 5,761,466 | 6/1998 | Chau .................................... | 712/200 |
| 5,787,488 | 7/1998 | Garde ................................... | 711/169 |
| 5,832,249 | 11/1998 | Tran et al. ............................ | 712/204 |
| 5,845,099 | 12/1998 | Krisnamurthy et al. ............. | 712/204 |
| 5,931,940 | 8/1999 | Shelton et al. ....................... | 712/204 |
| 5,941,980 | 8/1999 | Shang et al. ......................... | 712/204 |
| 5,968,163 | 10/1999 | Narayan et al. ..................... | 712/204 |
| 5,968,164 | 10/1999 | Loen et al. ........................... | 712/204 |

FOREIGN PATENT DOCUMENTS

| WO88/04806 | 6/1988 | WIPO . |
|---|---|---|
| WO 90/07154 | 6/1990 | WIPO . |

OTHER PUBLICATIONS

J.E. Brewer et al, "A Monolithic Processing Subsystem", IEEE Trans. On Components, Pack. & Manuf. Tech., Part B, vol. 17, No. 3, pp. 310–316, Aug. 1994.

J.E. Brewer er al, "A Single–Chip Digital Signal Processing Subsystem", 1994 Proceedings, Sixth Annual IEEE (ICWSI), San Francisco, CA, pp. 265–272, Jan. 1994.

T. Counihan et al, "On–chip Integrated Memories in DSP Architectures", Electronik, Jun. 14, 1994, Germany, vol. 43, No. 12, pp. 98–102, 104, 106.

IBM Technical Disclosure Bulletin, vol. 33, No. 10A, Mar. 1991, New York, pp. 1–5 Distributed Process Bulletin Board.

"MVP: The dawn of a new era in digital signal processing—Introducing TM5320C8X", Texas Instruments notes, date unknown.

C.P.Feigel, "TI Introduces Four–Processor DSP Chip", Microprocessor Report, Mar. 28, 1994, pp. 22–25.

P. Papamichalis et al, "The TMS320C30 Floating–Point Digital Signal Processor", IEEE Micro, Dec. 1988, pp. 13–29.

M.L. Fuccio et al, "The DSP32C: AT&T's Second–Generation Floating–Point Digital Signal Processor", IEEE Micro, Dec. 1988, pp. 30–48.

G.R.L. Sohie et al, "A Digital Signal Processor with IEEE Floating Point Arithmetic", IEEE Micro, Dec. 1988, pp. 49–67.

"State of the Art Power PC 620 Soars", BYTE, Nov. 1994, pp. 114 and 116.

Texas Instruments, TMS320c3X, "User's Guide", Digital Signal Processing Products, 1991, pp. 5–24–5–28.

*Primary Examiner*—William M. Treat
*Attorney, Agent, or Firm*—Wolf, Greenfield & Sacks, P.C.

[57] ABSTRACT

A high performance digital signal processor includes a memory for storing instructions and operands for digital signal computations and a core processor connected to the memory. The memory may include first, second and third memory banks connected to the core processor by first, second and third data and address buses, respectively. The core processor includes a program sequencer and may include first and second computation blocks for performing first and second subsets, respectively, of the digital signal computations. A data alignment buffer is provided between the memory banks and the computation blocks. The data alignment buffer permits unaligned accesses to specified operands that are stored in different memory rows. The specified operands are supplied to one or both of the computation blocks in the same processor cycle.

11 Claims, 4 Drawing Sheets

DIGITAL SIGNAL PROCESSOR HAVING DATA ALIGNMENT BUFFER FOR PERFORMING UNALIGNED DATA ACCESSES

FIELD OF THE INVENTION

This invention relates to digital signal processors and, more particularly, to digital signal processors that are capable of efficiently supplying to a computation unit operands that are stored in different rows of memory.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing and speech recognition. Digital signal processor applications are typically characterized by real time operation, high interrupt rates and intensive numeric computations. In addition, digital signal processor applications tend to be intensive in memory access operations and to require the input and output of large quantities of data. Thus, designs of digital signal processors may be quite different from those of general purpose computers.

One approach that has been used in the architecture of digital signal processors to achieve high speed numeric computation is the Harvard architecture, which utilizes separate, independent program and data memories so that the two memories may be accessed simultaneously. This architecture permits an instruction and an operand to be fetched from memory in a single clock cycle. Frequently, the program occupies less memory space than the operands for the program. To achieve full memory utilization, a modified Harvard architecture utilizes the program memory for storing both instructions and operands. Typically, the program and data memories are interconnected with the core processor by separate program and data buses.

Digital signal processors may utilize architectures wherein two or more data words are stored in each row of memory and two or more data words may be provided in parallel to the computation unit. Such architectures provide enhanced performance, because several instructions and/or operands may be accessed in parallel.

Digital signal processors are frequently required to perform digital filter computations, wherein output signal samples of a digital filter are computed for specified input signal samples. In a finite impulse response (FIR) digital filter, filter coefficients are multiplied by data values representative of respective signal samples, and the products are combined to provide a filter output value. The data values are then shifted relative to the filter coefficients, and the process is repeated to provide data values representative of successive filter output signal samples. Such computations are difficult to perform efficiently in digital signal processor architectures wherein two or more data words are stored in each row of memory. In particular, complex software routines are required to perform the computations, because the data values are not easily aligned with the proper coefficients on each clock cycle.

Accordingly, there is a need for improved digital signal processor architectures in which these difficulties are overcome.

SUMMARY OF THE INVENTION

According to a first aspect of the invention, a digital signal processor is provided. The digital signal processor comprises a memory for storing data words including instructions and operands for performing digital signal computations, a program sequencer, a computation unit, an instruction decoder and a data alignment buffer. The memory is organized in rows, each having locations for two or more data words. The program sequencer generates instruction addresses for fetching instructions from the memory and data addresses for fetching operands from the memory. The computation unit performs the digital signal computations using the instructions and the operands fetched from the memory. The instruction decoder generates one or more control signals in response to an instruction indicating an unaligned data access to specified operands stored in different rows of the memory. The data alignment buffer receives lines of operands from different rows of memory and provides the specified operands to the computation unit in response to the control signals.

The data alignment buffer may comprise a buffer for storing a first line of operands from a first of row of the memory and a multiplexer for receiving the first line of operands from the buffer and a second line of operands from a second row of memory, and for selecting the specified operands from the first and second lines of operands in response to the control signals. The multiplexer may provide the specified operands to a register file in the computation unit. The control signals may include an offset value supplied to the multiplexer and a load signal supplied to the buffer. The offset value represents an offset of the specified operands relative to a row of memory.

BRIEF DESCRIPTION OF THE DRAWINGS

For a better understanding of the present invention, reference is made to the accompanying drawings, which are incorporated herein by reference in which.

DETAILED DESCRIPTION

Figure 1:
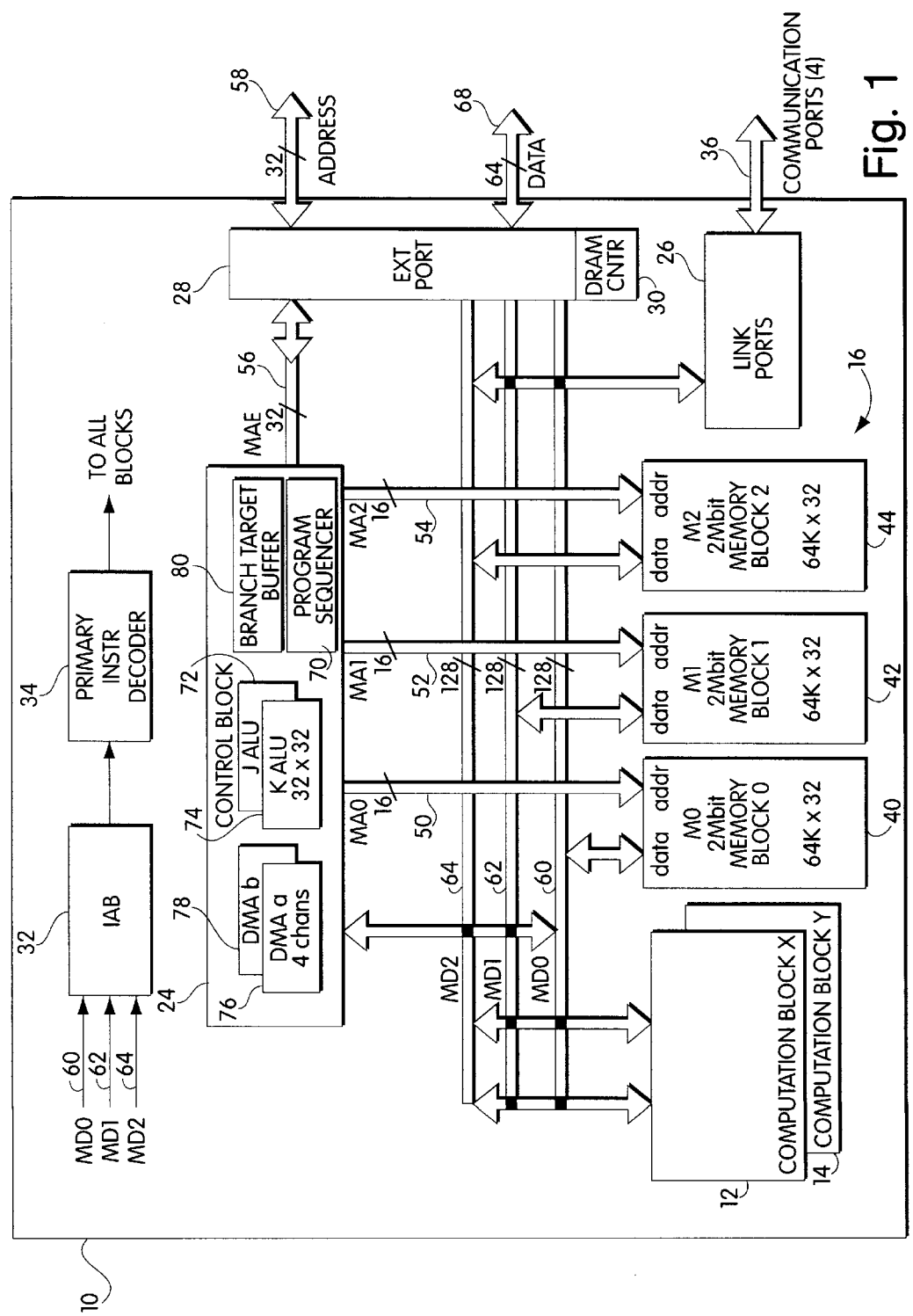
FIG. 1 is a block diagram of an example of a digital signal processor in accordance with the present invention.

A block diagram of a digital signal processor (DSP) 10 in accordance with the present invention is shown in FIG. 1. The principal components of DSP 10 are computation blocks 12 and 14, a memory 16, a control block 24, link port buffers 26, an external port 28, a DRAM controller 30, an instruction alignment buffer (IAB) 32 and a primary instruction decoder 34. The computation blocks 12 and 14, the instruction alignment buffer 32, the primary instruction decoder 34 and the control block 24 constitute a core processor which performs the main computation and data processing functions of the DSP 10. The external port 28 controls external communications via an external address bus 58 and an external data bus 68. The link port buffers 26 control external communication via communication ports 36. The DSP is preferably configured as a single monolithic integrated circuit and is preferably fabricated using a 0.35 micron gate, four metal, SRAM CMOS process. In a preferred embodiment, an external clock (not shown) at a frequency of 41.5 MHZ is internally multiplied by four to provide an internal clock at 166 MHZ.

The memory 16 includes three independent, large capacity memory banks 40, 42 and 44. In a preferred embodiment, each of the memory banks 40, 42 and 44 has a capacity of 64K words of 32 bits each. As discussed below, each of the memory banks 40, 42 and 44 preferably has a 128 bit data bus. Up to four consecutive aligned data words of 32 bits each can be transferred to or from each memory bank in a single clock cycle.

The elements of the DSP 10 are interconnected by buses for efficient, high speed operation. Each of the buses includes multiple lines for parallel transfer of binary information. A first address bus 50 (MA0) interconnects memory bank 40 (M0) and control block 24. A second address bus 52 (MA1) interconnects memory bank 42 (M1) and control block 24. A third address bus 54 (MA2) interconnects memory bank 44 (M2) and control block 24. Each of the address buses 50, 52 and 54 is preferably 16-bits wide. An external address bus 56 (MAE) interconnects external port 28 and control block 24. The external address bus 56 is interconnected through external port 28 to external address bus 58. Each of the external address buses 56 and 58 is preferably 32 bits wide. A first data bus 60 (MD0) interconnects memory bank 40, computation blocks 12 and 14, control block 24, link port buffers 26, IAB 32 and external port 28. A second data bus 62 (MD1) interconnects memory bank 42, computation blocks 12 and 14, control block 24, link port buffers 26, IAB 32 and external port 28. A third data bus 64 (MD2) interconnects memory bank 44, computation blocks 12 and 14, control block 24, link port buffers 26, IAB 32 and external port 28. The data buses 60, 62 and 64 are connected through external port 28 to external data bus 68. Each of the data buses 60, 62 and 64 is preferably 128 bits wide, and external data bus 68 is preferably 64 bits wide.

The first address bus 50 and the first data bus 60 comprise a bus for transfer of data to and from memory bank 40. The second address bus 52 and the second data bus 62 comprise a second bus for transfer of data to and from memory bank 42. The third address bus 54 and the third data bus 64 comprise a third bus for transfer of data to and from memory bank 44. Since each of the memory banks 40, 42 and 44 has a separate bus, the memory banks 40, 42 and 44 may be accessed simultaneously. As used herein, "data" refers to binary words, which may represent either instructions or operands that are associated with the operation of the DSP 10. In a typical operating mode, program instructions are stored in one of the memory banks, and operands are stored in the other two memory banks. Thus, at least one instruction and two operands can be provided to computation blocks 12 and 14 in a single clock cycle. As described below, each of the memory banks 40, 42, and 44 is configured to permit reading and writing of multiple data words in a single clock cycle. The simultaneous transfer of multiple data words from each memory bank in a single clock cycle is accomplished without requiring an instruction cache or a data cache.

The control block 24 includes a program sequencer 70, a first integer ALU 72 (J ALU), a second integer ALU 74 (K ALU), a first DMA address generator 76 (DMAG A) and a second DMA address generator 78 (DMAG B). The integer ALU's 72 and 74, at different times, execute integer ALU instructions and perform data address generation. During execution of a program, the program sequencer 70 supplies a sequence of instruction addresses on one of the address buses 50, 52, 54 and 56, depending on the memory location of the instruction sequence. Typically, one of the memory banks 40, 42 or 44 is used for storage of the instruction sequence. Each of the integer ALU's 72 and 74 supplies a data address on one of the address buses 50, 52, 54 and 56, depending on the location of the operand required by the instruction. Assume, for example, that an instruction sequence is stored in memory bank 40 and that the required operands are stored in memory banks 42 and 44. In this case, the program sequencer supplies instruction addresses on address bus 50 and the accessed instructions are supplied to the instruction alignment buffer 32, as described below. The integer ALU's 72 and 74 may, for example, output addresses of operands on address buses 52 and 54, respectively. In response to the addresses generated by integer ALU's 72 and 74, the memory banks 42 and 44 supply operands on data buses 62 and 64, respectively, to either or both of the computation blocks 12 and 14. The memory banks 40, 42 and 44 are interchangeable with respect to storage of instructions and operands.

The program sequencer 70 and the integer ALU's 72 and 74 may access an external memory (not shown) via external port 28. The desired external memory address is placed on address bus 56. The external address is coupled through external port 28 to external address bus 58. The external memory supplies the requested data word or data words on external data bus 68. The external data is supplied via external port 28 and one of the data buses 60, 62 and 64 to one or both of computation blocks 12 and 14. The DRAM controller 30 controls the external memory.

As indicated above, each of the memory banks 40, 42 and 44 preferably has a capacity of 64k words of 32 bits each. Each memory bank may be connected to a data bus that is 128 bits wide. In an alternative embodiment, each data bus may be 64 bits wide, and 64 bits are transferred on each of clock phase 1 and clock phase 2, thus providing an effective bus width of 128 bits. Multiple data words can be accessed in each memory bank in a single clock cycle. Specifically, data can be accessed as single, dual or quad words of 32 bits each. Dual and quad accesses require the data to be aligned in memory. Typical applications for quad data accesses are the fast Fourier transform (FFT) and complex FIR filters. Quad accesses also assist double precision operations. Preferably, instructions are accessed as quad words. However, instructions are not required to be aligned in memory.

Using quad word transfers, four instructions and eight operands, each of 32 bits, can be supplied to the computation blocks 12 and 14 in a single clock cycle. The number of data words transferred and the computation block or blocks to which the data words are transferred are selected by control bits in the instruction. The single, dual, or quad data words can be transferred to computation block 12, to computation block 14, or to both. Dual and quad data word accesses improve the performance of the DSP 10 in many applications by allowing several operands to be transferred to the computation blocks 12 and 14 in a single clock cycle. The ability to access multiple instructions in each clock cycle allows multiple operations to be executed in each cycle, thereby improving performance. If operands can be supplied faster than they are needed by the computation blocks 12 and 14, then there are memory cycles left over that can be used by the DMA address generators 76 and 78 to provide new data to the memory banks 40, 42 and 44 during those unused cycles, without stealing cycles from the core processor. Also, where one instruction can transfer multiple operands, instruction slots may be available for performing other operations, thereby enhancing performance. Finally, the ability to access multiple data words makes it possible to utilize two or more computation blocks and to keep them supplied with operands. The ability to access single or dual data words reduces power consumption in comparison with a configuration where only quad data words are accessed.

Figure 2:
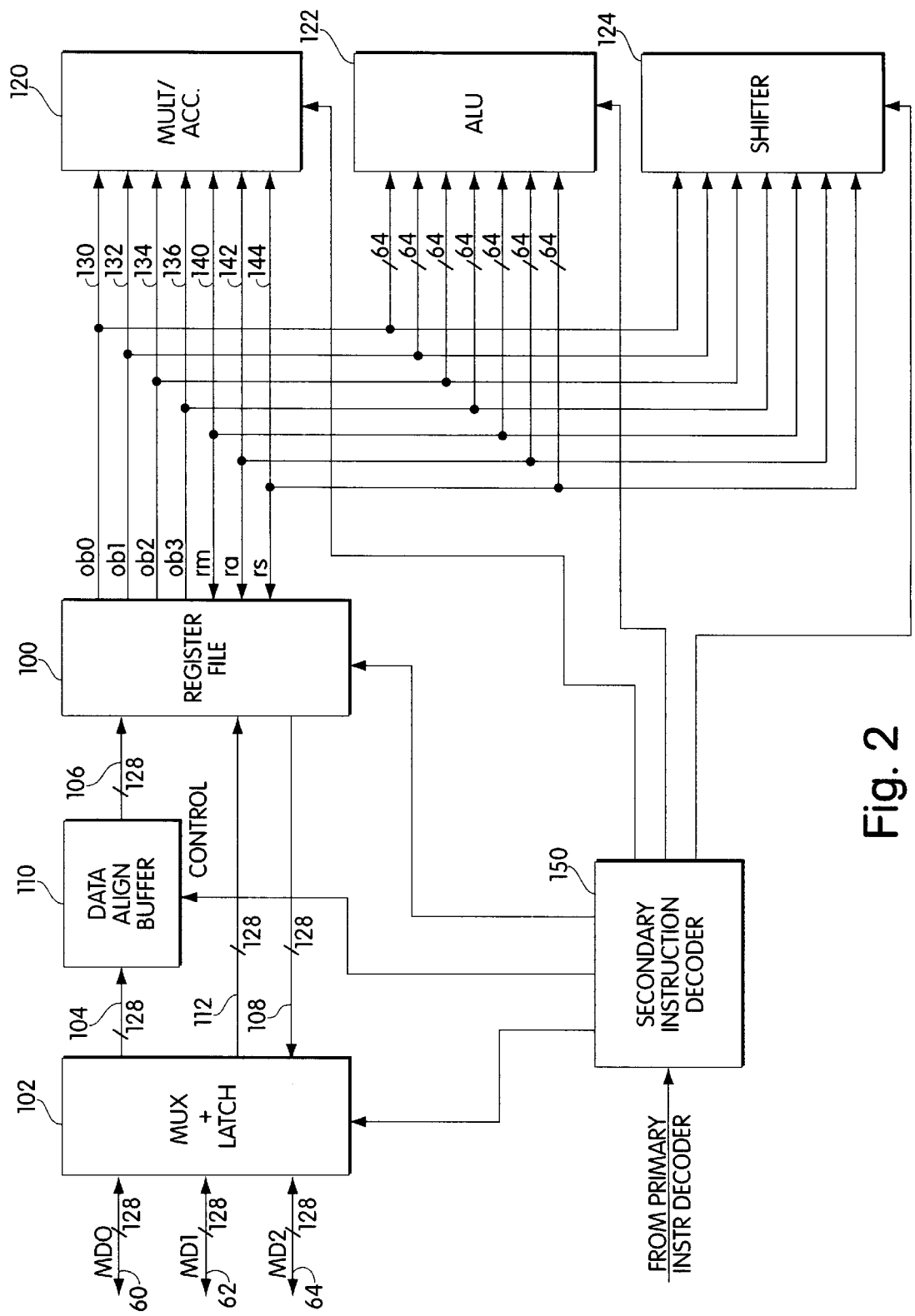
FIG. 2 is a block diagram of an example of each computation block shown in FIG. 1.

A block diagram of an exemplary embodiment of each of the computation blocks 12 and 14 is shown in FIG. 2. A multiple port register file 100 provides temporary storage for operands and results. In a preferred embodiment, the register file 100 has a capacity of 32 words of 32 bits each, organized as 8 rows of 128 bits each. The register file 100 is connected through a multiplexer and latch 102 and a data alignment buffer 110 to each of the data buses 60, 62 and 64. When operands are fetched from memory 16, one or two of the three data buses may be selected. The operands on one of the selected buses are supplied to the data alignment buffer 110 on a bus 104. The operands on the other of the selected buses are supplied to the register file 100 on a bus 112. The data alignment buffer 110 supplies operands to register file 100 on a bus 106, as described in detail below. When data is being written from the register file 100 to memory 16 or to an external memory, the data is supplied to multiplexer and latch 102 on a bus 108. Each of the buses 104, 106, 108 and 112 may be 128 bits wide. The output data on bus 108 is switched by multiplexer and latch 102 to selected ones of the data buses 60, 62 and 64 for writing to memory. In addition to selecting one or two of the three data buses 60, 62 and 64, the multiplexer and latch 102 permits word selection within each bus under instruction control. In the case of single word transfers, the multiplexer and latch 102 may or may not select the accessed data word. In the case of dual word transfers, the multiplexer and latch 102 may select either or both data words. In the case of quad word transfers, the multiplexer and latch 102 may select different combinations of dual data words or may select the entire quad data word.

The computation block shown in FIG. 2 includes a multiplier/accumulator 120, an arithmetic logic unit (ALU) 122 and a shifter 124. The multiplier/accumulator 120, the ALU 122 and the shifter 124 are capable of simultaneous execution of instructions to the extent that sufficient instructions and operands can be supplied to the computation block. Operands are supplied from the register file 100 to multiplier/accumulator 120, ALU 122 and shifter 124 on four operand buses 130 (ob0),132 (ob1), 134 (ob2) and 136 (ob3). Each of the operand buses 130, 132,134 and 136 is 64 bits wide. Results from the multiplier/accumulator 120 are returned to the register file 100 on a result bus 140 (rm). Results from the ALU 122 are returned to the register file 100 on a result bus 142 (ra) and a result bus 144 (rs). Results from the shifter 124 are returned to the register file 100 on result bus 144. The result buses 140, 142 and 144 are connected to each of the computation units, including multiplier/accumulator 120, ALU 122 and shifter 124, so that each computation unit can obtain operands directly from the result buses 140, 142 and 144. Each of the result buses 140, 142 and 144 is preferably 64 bits wide. Addressing of the register file 100 and control signals for the multiplexer and latch 102, multiplier/accumulator 120, ALU 122 and shifter 124 are provided from a secondary instruction decoder 150. The secondary instruction decoder 150 decodes instructions supplied from the primary instruction decoder 34 (FIG. 1). Each of the two computation blocks 12 and 14 may execute up to three instructions in the same clock cycle, one each for the multiplier/accumulator 120, the ALU 122 and the shifter 124.

In the architecture illustrated in FIG. 1, the instruction alignment buffer 32 and the primary instruction decoder 34 are centralized. Instructions fetched from one of the memory banks 40, 42 and 44 are supplied to instruction alignment buffer 32 on one of the data buses 60, 62 and 64. The instructions are aligned for execution in the clock cycle required by the instruction sequence and are partially decoded by the primary instruction decoder 34. The partially decoded instructions are supplied to the appropriate block in the DSP 10. For example, the instructions may be supplied to one or both of the computation blocks 12 and 14 or to the control block 24. Decoding of the instruction is completed by the block which utilizes the instruction. For example, as shown in FIG. 2, the secondary instruction decoder 150 completes decoding of computation instructions.

Figure 3:
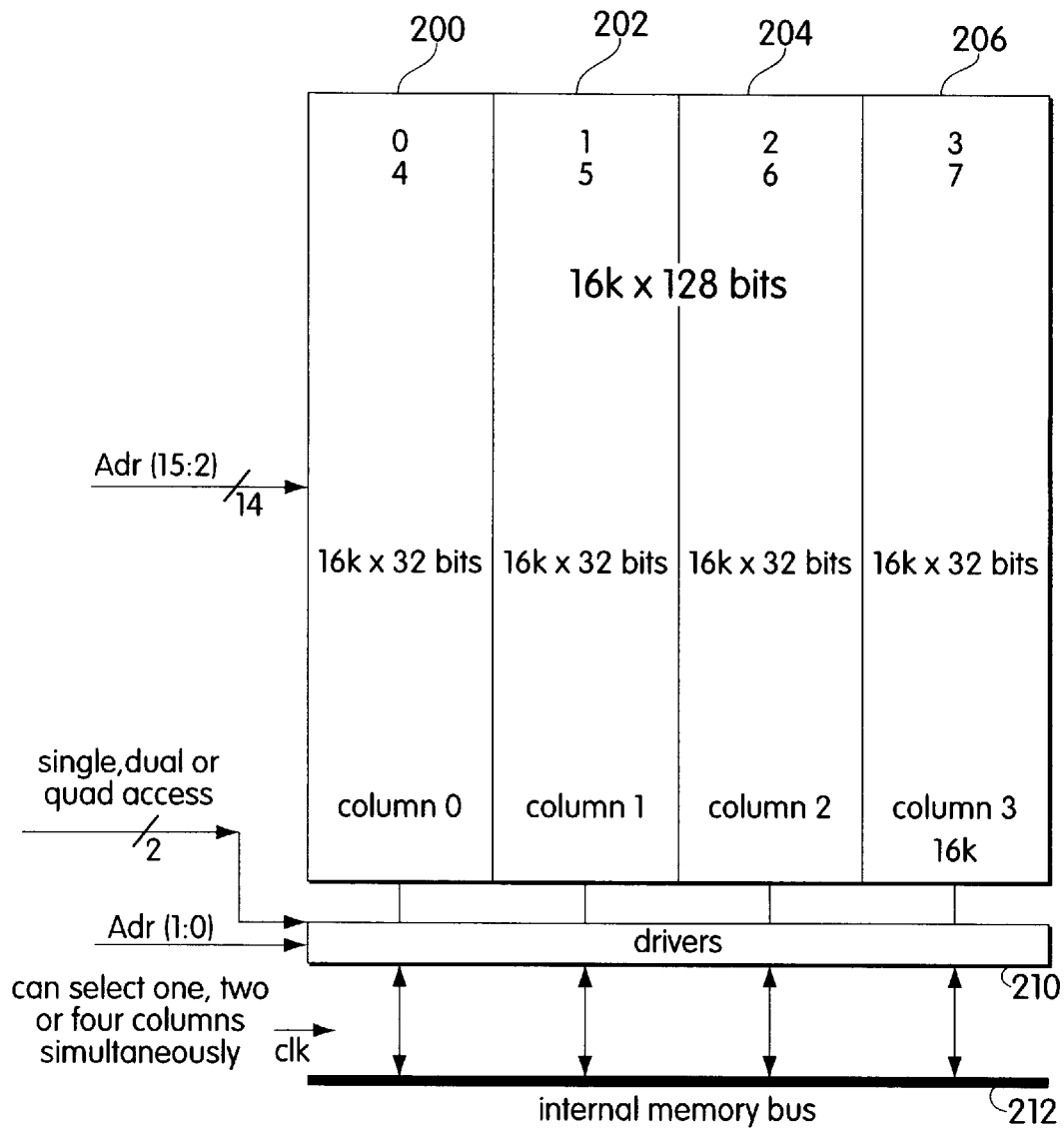
FIG. 3 is a block diagram of an example of each memory bank shown in FIG. 1.

A block diagram representative of each of the memory banks 40, 42 and 44 is shown in FIG. 3. Each memory bank is organized as four columns 200, 202, 204 and 206 of memory locations. In this example, each column is organized as 16K words of 32 bits each. The addresses increase linearly across columns 200, 202, 204 and 206. The data lines for each of the columns 200, 202, 204 and 206 are connected through drivers 210 to a data bus 212. The data bus 212 corresponds to one of the data buses 60, 62 and 64 shown in FIG. 1 and described above. Data bus 212 is preferably 128 bits wide. Address bits (15:2) are supplied to columns 200, 202, 204 and 206, and address bits (1:0) are supplied to drivers 210. The address bits supplied to columns 200, 202, 204 and 206 address a row of four consecutive aligned data words of 32 bits each, one in each column. The drivers 210 receive a two bit signal which indicates whether a single, dual or quad data word is being accessed. As described above, single, dual or quad word transfers may be performed in a single clock cycle.

For single word transfers, address bits (15:2) select a row of four consecutive aligned data words, and the address bits (1:0) select one of the columns 200, 202, 204 and 206. The drivers 210 drive the selected word onto the bus 212.

For dual word transfers, address bits (15:2) select a row of four consecutive aligned data words, and address bit (1) selects a pair of adjacent columns. Columns 200 and 202 or columns 204 and 206 may be selected. The selected dual words are driven onto data bus 212 by drivers 210.

For quad word transfers, consecutive aligned words in columns 200, 202, 204 and 206 are selected by address bits (15:2). The quad words are driven onto data bus 212 by drivers 210. For single, dual and quad word transfers, the selected words are preferably driven directly onto data bus 212 without left or right shifting.

The ability to access multiple data words improves performance of the digital signal processor as described above. However, the architecture described above involves aligned accesses to the memory banks 40, 42 and 44. Aligned accesses to operands involve the transfer of operands in a single row of a memory bank to one or both of the computation blocks 12 and 14. As discussed above, some computations, such as FIR filter computations, are made relatively complex when memory accesses are restricted to aligned accesses.

In accordance with the invention, the digital signal processor 10 is provided with the capability to perform unaligned accesses. The phrase "unaligned accesses" refers to accesses to specified operands in different rows of memory. The specified operands are unaligned with respect to memory, but may be supplied to one or both of computation blocks 12 and 14 in parallel, i.e. on the same processor cycle, as described below. By contrast, aligned accesses are those which access specified operands in a single row of memory.

Figure 4:
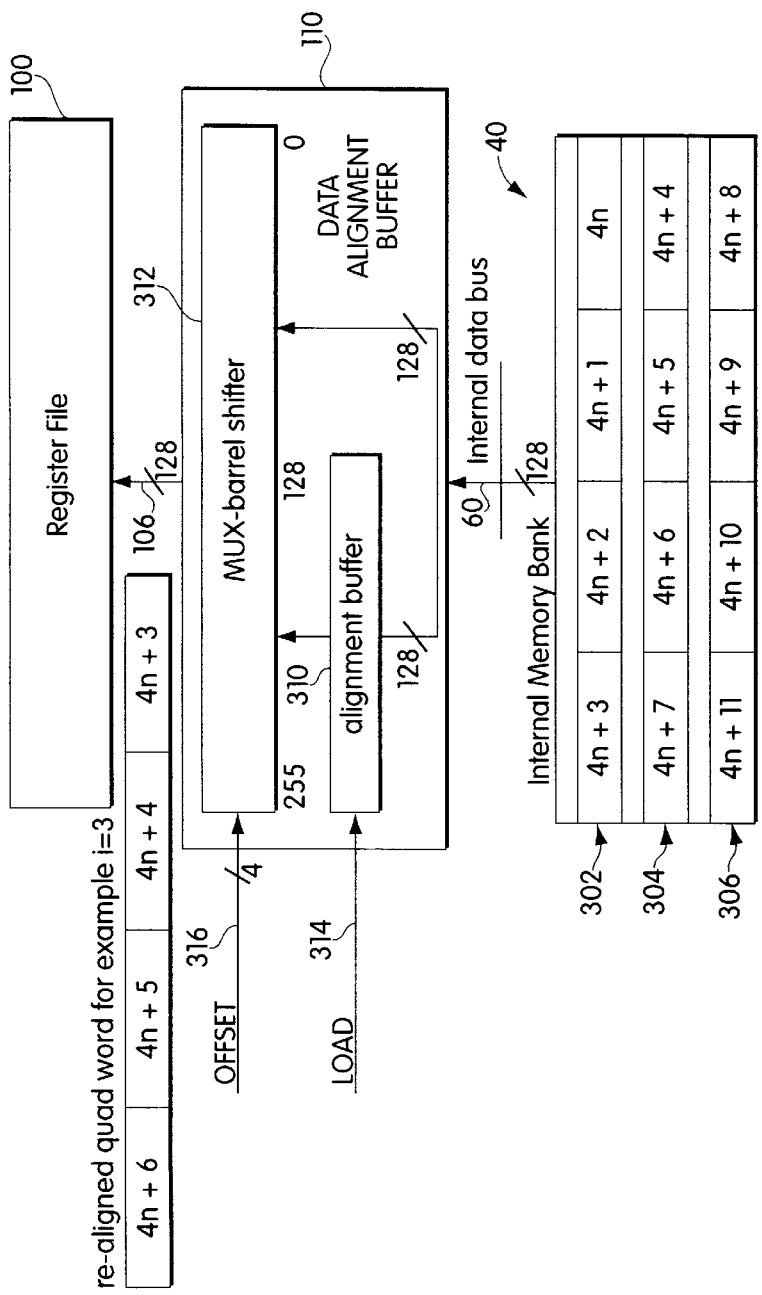
FIG. 4 is a block diagram showing an example of a data alignment buffer in accordance with the invention.

A portion of memory bank 40 is illustrated in FIG. 4. As described above, each memory bank may be organized as rows of four consecutive 32-bit words. Memory rows 302, 304 and 306 of memory bank 40 are illustrated in FIG. 4. Memory row 302 includes locations 4n, 4n+1, 4n+2 and 4n+3. Memory row 304 includes locations 4n+4, 4n+5, 4n+6 and 4n+7. Memory row 306 includes locations 4n+8, 4n+9, 4n+10 and 4n+11. A set of specified operands may include one or more operands stored in memory row 302 and one or more operands stored in memory row 304. For example, a specified quad data word may include word 4n+3 from memory row 302 and words 4n+4, 4n+5 and 4n+6 from memory row 304. The operands may be specified by an offset value relative to a memory row. In the above example, the specified operands are offset by three locations relative to memory row 302. It will be understood that the specified operands may have different offset values relative to a memory row. Thus, an offset value of zero specifies an aligned access wherein four operands are accessed in memory row 302. An offset value of one specifies an unaligned access wherein words 4n+1, 4n+2, 4n+3 are accessed in memory row 302, and word 4n+4 is accessed in memory row 304. An offset value of two specifies an unaligned access wherein words 4n+2 and 4n+3 are accessed in memory row 302, and words 4n+4 and 4n+5 are accessed in memory row 304. Finally, an offset value of three specifies an unaligned access wherein word 4n+3 is accessed in memory row 302, and words 4n+4, 4n+5 and 4n+6 are accessed in memory row 304.

Data alignment buffer 110 receives first and second lines of operands from first and second memory rows, respectively, and supplies the specified operands, selected from the first and second lines of operands in response to control signals, to register file 100 in one or both of computation blocks 12 and 14 (see FIG. 2). The data alignment buffer 110 may also supply operands from a single memory row to register file 100.

Data alignment buffer 110 includes an alignment buffer 310 and a multiplexer/barrel shifter 312. In the example of FIG. 4, memory bank 40 is connected to data alignment buffer 110 by 128-bit bus 60. Multiplexer and latch 102 (FIG. 2) is omitted from FIG. 4 for ease of understanding. Alignment buffer 310 may have a capacity of 128 bits and is loaded in response to a load signal 314. Multiplexer/barrel shifter 312 may receive 256 bits, including 128 bits (inputs 0–127) from memory bank 40 on data bus 60 and 128 bits (inputs 128–255) from the output of alignment buffer 310. The multiplexer/barrel shifter 312 selects 128 bits of the 256 bits at its inputs in response to an offset signal 316 and supplies the selected 128 bits (the specified operands) to register file 100 on bus 106. It will be understood that the operands supplied to data alignment buffer 110 may be accessed in any of the memory banks 40, 42 and 44 and supplied to data alignment buffer 110 by multiplexer and latch 102.

As noted above, data alignment buffer 110 may be used for aligned accesses and unaligned accesses. In an aligned access, the specified operands are supplied from a single memory row via bus 60 and multiplexer/barrel shifter 312 to register file 100. In an unaligned access, the specified operands are supplied from two memory rows via bus 60, alignment buffer 310 and multiplexer/barrel shifter 312 to register file 100.

Figure 5:
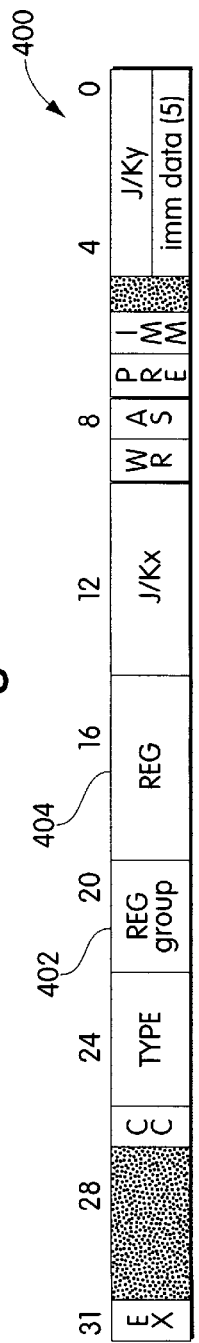
FIG. 5 illustrates an example of a format of a memory move instruction that may be used in the digital signal processor of FIG. 1.

The data alignment buffer 110 is controlled in response to individual instructions being executed by the digital signal processor. An example of a memory move instruction 400 is illustrated in FIG. 5. A register group field 402 specifies a register group in computation block 12 or 14, control block 24 or external port 28. A register field 404 specifies a register within the register group. J/Kx and J/Ky specify registers which contain addresses in a memory bank. The register group field 402 may specify different functions with respect to the same registers. In particular, one of the register groups is used to specify unaligned data accesses. When the register group field 402 of the instruction specifies unaligned data accesses, the data alignment buffer 110 supplies the specified operands to register file 100 as follows. In a first cycle, the instruction decoder 150 (FIG. 2) supplies a load signal to alignment buffer 310, and the quad word in memory row 302 is loaded into alignment buffer 310. In a second cycle, the quad word in alignment buffer 310 is supplied to inputs 128–255 of multiplexer/barrel shifter 312, and the quad word in memory row 304 is supplied to inputs 0–127 of multiplexer/barrel shifter 312. The multiplexer/barrel shifter 312 thus has two lines of operands, consisting of eight 32-bit operands, at its inputs. The instruction decoder 150 supplies an offset value, which is part of the J/Kx or J/Ky register address, to multiplexer/barrel shifter 312 for selecting the desired operands from the operands at its inputs. As indicated above, the selected operands may be from the same or different memory rows, depending on the offset value. The offset value is obtained from the least significant bits (LSB's) of the operand address specified by the J/Kx or J/Ky register and instruction 400. After the specified operands have been supplied to register file 100, the line of operands stored in memory row 304 is loaded into alignment buffer 310. The operations of the second cycle may be repeated in successive cycles to provide unaligned accesses on consecutive processor cycles. In the next cycle, the quad word in alignment buffer 310 (memory row 304) is supplied to inputs 128–255 of multiplexer/barrel shifter 312, and the quad word in memory row 306 is supplied to inputs 0–127 of multiplexer/barrel shifter 312. The multiplexer/barrel shifter 312 supplies specified operands to register file 100 in accordance with the offset value. Thus, unaligned data accesses may be performed on each cycle after the first cycle of the unaligned data access which, as described above, is used for initial loading of alignment buffer 310.

When the register group field 402 of the instruction specifies an unaligned access, data alignment buffer 110 supplies operands to register file 100. In this case, the instruction decoder 150 supplies control signals, including the load signal and the offset value, to data alignment buffer 110. When the register group field 402 of the instruction specifies an aligned access, the data alignment buffer 110 also supplies aligned operands to register file 100. However, the load signal and offset value are not required. In the case of an aligned access, the data words in each memory row are supplied to inputs 0–127 of multiplexer/barrel shifter 312. The offset value is fixed at zero, and the specified operands are supplied on bus 106 to register file 100. Accordingly, aligned accesses and unaligned accesses may be intermixed in a particular program.

A further feature of the data alignment buffer 110 is that unaligned data accesses are not restricted to sequential memory addresses. This feature permits circular buffers to wrap back to a starting point during a series of unaligned accesses. An interrupt routine that uses unaligned data accesses is required to store the contents of data alignment buffer 110 before use and to restore the contents of data alignment buffer 110 after use.

Unaligned data accesses have been described in connection with a configuration where each memory row contains four 32-bit data words. In that configuration, the offset value has two bits for specifying one of four offset values. In another configuration, each memory row may contain eight 16-bit words, and offset values from 0–7 may be specified. In this configuration, the three LSB's of the operand address are used as the offset value. It will be understood that memory configurations having different numbers of data words per memory row and different numbers of bits per data word are included within the scope of the present invention.

In the approach described above, the register group field of the instruction specifies an unaligned access. In a second approach, aligned accesses may be distinguished from unaligned accesses by detecting only the value of the LSB's of the data address. A zero value of the LSB's indicates an aligned access, whereas a non-zero value of the LSB's indicates an unaligned access. The alignment buffer is used for non-zero values of the LSB's, but when the LSB's are zero, the alignment buffer is not used. Since different procedures are required for different values of the LSB's, extra complexity is involved. Accordingly, this second approach is less desirable than the first approach, but may be useful in some applications.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A digital signal processor comprising:

a memory for storing data words including instructions and operands for performing digital signal computations, said memory organized in rows each having locations for two or more of said data words;

a program sequencer for generating instruction addresses for fetching instructions from said memory and data addresses for fetching operands from said memory;

a computation unit for performing said digital signal computations using said instructions and said operands fetched from said memory;

an instruction decoder for generating one or more control signals in response to an instruction indicating an unaligned data access to specified operands stored in different rows of said memory; and a data alignment buffer for receiving lines of operands from different rows of said memory and for providing said specified operands to said computation unit in response to said one or more control signals, said one or more control signals including an offset value that identifies memory locations of the specified operands relative to a row of said memory, wherein different specified operands are selected from the different rows of said memory based on the offset value.

2. A digital signal processor as defined in claim 1, wherein said data alignment buffer comprises:

a buffer for storing a first line of operands from a first row of said memory; and a multiplexer for receiving said first line of operands from said buffer and a second line of operands from a second row of said memory and for selecting said specified operands from said first and second lines of operands in response to said offset value.

3. A digital signal processor as defined in claim 2, wherein said computation unit includes a register file and wherein said multiplexer provides said specified operands to the register file.

4. A digital signal processor as defined in claim 1 wherein each row of said memory comprises four 32-bit data words.

5. A digital signal processor as defined in claim 1 wherein each row of said memory comprises eight 16-bit data words.

6. A digital signal processor as defined in claim 1, wherein said data alignment buffer further comprises means responsive to a sequence of instructions, each indicating an unaligned data access to specified operands, for providing said specified operands to said computation unit on successive processor cycles.

7. A digital signal processor as defined in claim 2 where said control signals further include a load signal supplied to said buffer.

8. A digital signal processor comprising:

a memory for storing data words including instructions and operands, said memory organized in rows each having locations for two or more of said data words;

a computation unit for performing digital signal computations using said instructions and said operands fetched from said memory; and a data alignment buffer disposed between said memory and said computation unit for providing to said computation unit specified operands that are stored in different rows of said memory in response to an instruction indicating an unaligned data access, said instruction containing an offset value that identifies memory locations of the specified operands relative to a row of said memory, wherein different specified operands are selected from the different rows of said memory based on the offset value.

9. A digital signal processor as defined in claim 8, wherein said data alignment buffer comprises:

a buffer for storing a first line of operands from a first row of said memory; and a multiplexer for receiving said first line of operands from said buffer and a second line of operands from a second row of said memory and for selecting said specified operands from said first and second lines of operands in response to said offset value.

10. A digital signal processor as defined in claim 9, wherein said computation unit includes a register file and wherein said multiplexer provides said specified operands to the register file.

11. A digital signal processor as defined in claim 8, wherein said data alignment buffer further comprises means responsive to a sequence of instructions, each indicating an unaligned data access to specified operands, for providing said specified operands to said computation unit on successive processor cycles.

* * * * *